US010755366B2

(12) United States Patent
Co et al.

(10) Patent No.: US 10,755,366 B2
(45) Date of Patent: *Aug. 25, 2020

(54) DISSEMINATING FLOOR QUOTES FROM OPEN OUTCRY MARKETS

(71) Applicant: Chicago Mercantile Exchange Inc., Chicago, IL (US)

(72) Inventors: Richard Co, Chicago, IL (US); John Labuszewski, Westmont, IL (US); John Nyhoff, Darien, IL (US); James Boudreault, Palatine, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/424,971

(22) Filed: May 29, 2019

(65) Prior Publication Data

US 2019/0279312 A1    Sep. 12, 2019

Related U.S. Application Data

(63) Continuation of application No. 14/061,286, filed on Oct. 23, 2013, now Pat. No. 10,354,338.

(51) Int. Cl.
*G06Q 40/04*    (2012.01)
*G06Q 50/00*    (2012.01)

(52) U.S. Cl.
CPC ............. *G06Q 50/01* (2013.01); *G06Q 40/04* (2013.01)

(58) Field of Classification Search
CPC combination set(s) only.
See application file for complete search history.

(56) References Cited

U.S. PATENT DOCUMENTS

| 7,020,632 | B1 | 3/2006 | Kohls |
| 7,337,140 | B2 | 2/2008 | Brady |
| 7,373,322 | B1 | 5/2008 | Patterson |
| 8,065,373 | B2 | 11/2011 | Bryan |
| 8,140,629 | B2 | 3/2012 | Bryan |
| 8,176,127 | B2 | 5/2012 | Keen, Jr. |
| 8,224,707 | B1 | 7/2012 | Smith |

(Continued)

OTHER PUBLICATIONS

Chicago Mercantile Exchange, Student Manual, "An Introduction to Futures and Options, Chapter 3 Trading Venues: Open Outcry & Electronic Trade Matching", Copyright 2006 CME, pp. 22-36, 132 pages.

(Continued)

*Primary Examiner* — Asha Puttaiah
(74) *Attorney, Agent, or Firm* — Lempia Summerfield Katz LLC (57) ABSTRACT

One or more methods may be used to disseminate floor quotes from an open outcry financial market, such as via messages posted on a social network. These messages may include additional information for providing "color" to the price quotation. In some cases, a method of disseminating the floor quotes may include receiving, at a computer device, a request from a trader to receive an authenticated user name associated with a financial exchange. The financial exchange may then permit the trader to post one or more messages to a social network using the authenticated user name, where the message includes information about a trade on the financial exchange.

20 Claims, 3 Drawing Sheets

(56) References Cited

U.S. PATENT DOCUMENTS

| | | |
|---|---|---|
| 8,260,865 B2 | 9/2012 | Bryan |
| 2002/0178108 A1 | 11/2002 | Tresser |
| 2003/0126068 A1* | 7/2003 | Hauk .................. G06Q 30/08 705/37 |
| 2007/0027797 A1 | 2/2007 | Claus |
| 2008/0015970 A1 | 1/2008 | Brookfield |
| 2008/0086426 A1 | 4/2008 | Dilip |
| 2009/0171950 A1 | 7/2009 | Lunenfeld |
| 2009/0197681 A1 | 8/2009 | Krishnamoorthy |
| 2012/0197779 A1 | 8/2012 | Studnitzer |
| 2013/0046709 A9* | 2/2013 | Crosthwaite .......... G06Q 40/06 705/36 R |
| 2013/0297481 A1* | 11/2013 | Assia .................. G06Q 40/04 705/37 |
| 2015/0269628 A1 | 9/2015 | Urtso |

OTHER PUBLICATIONS

Domowitz et al., "Auctions and Algorithms, Computerized Trade Execution and Price Discovery", Journal of Economic Dynamics and Control, 1994, pp. 29-60, vol. 18.

Ian Domowitz, "A Taxonomy of Automated Trade Exeuction Systems", Journal of International Money and Finance, 1993, pp. 607-631, vol. 12.

Yang et al., "Twitter Financial Community Sentiment and its Predictive Relationship to Stock Market Movement", Quantitative Finance, 2015, pp. 1637-1656, vol. 15, No. 10.

* cited by examiner

DISSEMINATING FLOOR QUOTES FROM OPEN OUTCRY MARKETS

CROSS REFERENCE TO RELATED APPLICATIONS

This application is a continuation under 37 C.F.R. § 1.53(b) of U.S. patent application Ser. No. 14/061,286 filed Oct. 23, 2013 now U.S. Pat. No. 10,354,338, the entire disclosure of which is incorporated by reference in its entirety.

BACKGROUND

In many financial markets, quotations from an open outcry environment associated with a particular financial exchange may be transmitted to electronic quotation systems via pit reporters employed by the exchange. As such, in this centralized environment, the financial exchange may be solely responsible for disseminating pricing information that reflects the prevailing market. These reporters are stationed at the periphery of the pit and enter information regarding transacted prices into a computer as a price quotation. These price quotations are relayed to a commercial quote vendor who retransmits the price quotation information, such as on the electronic quotation system associated with the particular commercial quote vendor. Often, however, the price quotations entered by a particular reporter primarily reflects a price associated with a particular financial product. When the number of offered financial products increases, this centralized approach for disseminating pricing quotations may become impractical. As such, there remains a need for improved and/or decentralized systems and techniques for disseminating pricing quotations from the trading floor of an open outcry market.

SUMMARY

This Summary is provided to introduce a selection of concepts in a simplified form that are further described below in the Detailed Description. This Summary is not intended to identify key or essential features of the invention.

In at least some embodiments, a financial exchange may authorize individuals (e.g., a trader) to post authorized and/or verified messages to a social network. A computing device associated with the financial exchange may receive a request from a trader for an authenticated user name. The authenticated user name may identify the trader as being authorized by the financial exchange to provide message content corresponding to operations of a financial exchange. The computing device may permit the trader to post one or more messages to a social network using the authenticated user name. In some cases, the one or more messages include information about a financial activity at the financial exchange.

In at least some embodiments, one or more non-transitory computer-readable media may store computer executable instructions that, when executed, cause a computer system to perform operations that include authenticating a trader active in an open outcry environment of a financial exchange. The computer device may be caused to provide user identification to the trader after a successful authentication. The user identification may be for use when posting information onto a social network from the open outcry environment of the financial exchange. In some cases, the instructions may cause the computer system to post a message that may include information about one or more financial transactions to the social network from the open outcry environment and including the user identification. The message may be posted to the social network via a computing network associated with the financial exchange.

In at least some embodiments, a computer system for posting authorized and/or verified messages to a social network may include at least one processor and at least one transitory memory coupled to the processor. The memory may store instructions that may cause the processor to perform operations that may include providing a user identification to a trader after a successful authentication of one or more credentials associated with the trader. The user identification may be used when posting information onto a social network from an open outcry environment of a financial exchange. The processor may be caused to post a message including information about one or more financial transactions to the social network from the open outcry environment. The message may include the user identification, wherein the message may be posted to the social network via a computing network associated with the financial exchange.

In at least some embodiments, a computer system for determining a margin requirement for an account may include at least one processor and at least one non-transitory memory. In some cases, the non-transitory memory may store instructions that, when executed, cause the computer system to perform operations that cause the computer system to receive account information about an account holding two or more derivatives positions. Each of two or more derivatives positions may have an associated first margin requirement. The computer system may also calculate a second spread margin requirement for each of one or more spread positions corresponding to the plurality of derivatives positions included in the account and determine a minimum third account margin requirement for the account using a linear programming technique. The linear programming technique may calculate the third account margin requirement using the first margin requirement for each of the plurality of derivatives positions and the second spread margin requirement for each of the one or more spread positions.

Embodiments include, without limitation, methods for determining a margin requirement for an account, computer systems configured to perform such methods, and computer-readable media storing instructions that, when executed, cause a computer system to perform such methods.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

In the following description of various embodiments, reference is made to the accompanying drawings, which form a part hereof, and in which various embodiments are shown by way of illustration. It is to be understood that there are other embodiments and that structural and functional modifications may be made. Embodiments of the present invention may take physical form in certain parts and steps, examples of which will be described in detail in the following description and illustrated in the accompanying drawings that form a part hereof.

Exemplary Operating Environment

Figure 1:
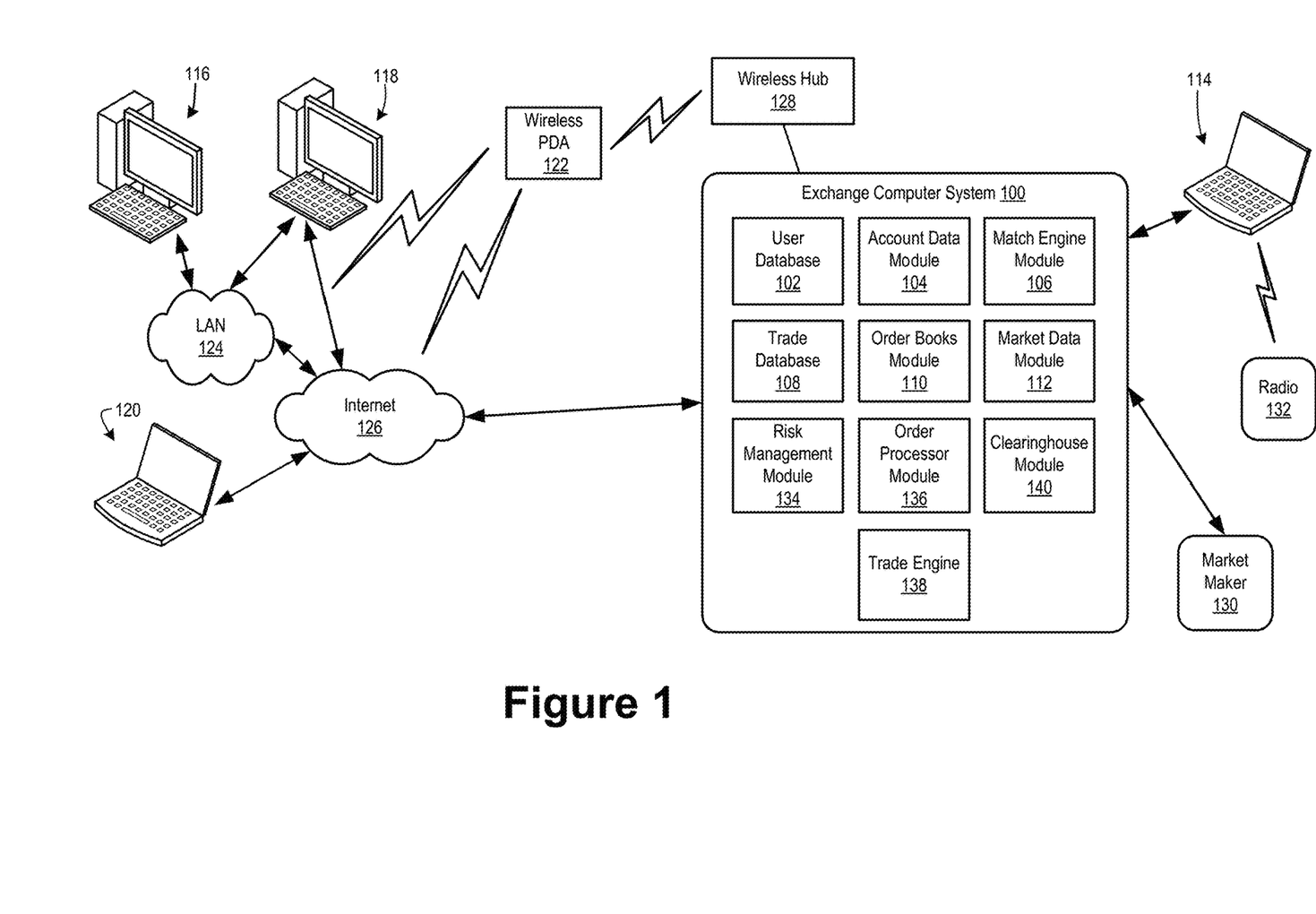
FIG. 1 shows an exemplary trading network environment for implementing trading systems and methods according to at least some embodiments.

Aspects of at least some embodiments can be implemented with computer systems and computer networks that allow users to communicate trading information. An exemplary trading network environment for implementing trading systems and methods according to at least some embodiments is shown in FIG. 1. The implemented trading systems and methods can include systems and methods, such as are described herein, that facilitate trading and other activities associated with financial products based on currency pairs.

Computer system 100 can be operated by a financial product exchange and configured to perform operations of the exchange for, e.g., trading and otherwise processing various financial products. Financial products of the exchange may include, without limitation, futures contracts, options on futures contracts ("futures contract options"), and other types of derivative contracts. Financial products traded or otherwise processed by the exchange may also include over-the-counter (OTC) products such as OTC forwards, OTC options, etc.

Computer system 100 receives orders for financial products, matches orders to execute trades, transmits market data related to orders and trades to users, and performs other operations associated with a financial product exchange. Exchange computer system 100 may be implemented with one or more mainframe, desktop or other computers. In one embodiment, a computer device uses one or more 64-bit processors. A user database 102 includes information identifying traders and other users of exchange computer system 100. Data may include user names and passwords. An account data module 104 may process account information that may be used during trades. A match engine module 106 is included to match prices and other parameters of bid and offer orders. Match engine module 106 may be implemented with software that executes one or more algorithms for matching bids and offers.

A trade database 108 may be included to store information identifying trades and descriptions of trades. In particular, a trade database may store information identifying the time that a trade took place and the contract price. An order book module 110 may be included to store prices and other data for bid and offer orders, and/or to compute (or otherwise determine) current bid and offer prices. A market data module 112 may be included to collect market data, e.g., data regarding current bids and offers for futures contracts, futures contract options and other derivative products. Module 112 may also prepare the collected market data for transmission to users. A risk management module 134 may be included to compute and determine a user's risk utilization in relation to the user's defined risk thresholds. An order processor module 136 may be included to decompose delta based and bulk order types for further processing by order book module 110 and match engine module 106.

A clearinghouse module 140 may be included as part of exchange computer system 100 and configured to carry out clearinghouse operations. Module 140 may receive data from and/or transmit data to trade database 108 and/or other modules of computer system 100 regarding trades of futures contracts, futures contracts options, OTC options and contracts, and other financial products. Clearinghouse module 140 may facilitate the financial product exchange acting as one of the parties to every traded contract or other product. For example, computer system 100 may match an offer by party A to sell a financial product with a bid by party B to purchase a like financial product. Module 140 may then create a financial product between party A and the exchange and an offsetting second financial product between the exchange and party B. As another example, module 140 may maintain margin data with regard to clearing members and/or trading customers. As part of such margin-related operations, module 140 may store and maintain data regarding the values of various contracts and other instruments, determine mark-to-market and final settlement amounts, confirm receipt and/or payment of amounts due from margin accounts, confirm satisfaction of final settlement obligations (physical or cash), etc. As discussed in further detail below, module 140 may determine values for performance bonds associated with trading in products based on various types of currency pairs.

Each of modules 102 through 140 could be separate software components executing within a single computer, separate hardware components (e.g., dedicated hardware devices) in a single computer, separate computers in a networked computer system, or any combination thereof (e.g., different computers in a networked system may execute software modules corresponding more than one of modules 102-140).

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may implement one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics, radio links or other media.

A wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet. Computers 116, 118 and 120 may communicate with each other via the Internet 126 and/or LAN 124.

One or more market makers 130 may maintain a market by providing constant bid and offer prices for a derivative or security to exchange computer system 100. Exchange computer system 100 may also include trade engine 138. Trade engine 138 may, e.g., receive incoming communications from various channel partners and route those communications to one or more other modules of exchange computer system 100.

One skilled in the art will appreciate that numerous additional computers and systems may be coupled to exchange computer system 100. Such computers and systems may include, without limitation, additional clearing systems (e.g., computer systems of clearing member firms), regulatory systems and fee systems.

The operations of computer devices and systems shown in FIG. 1 may be controlled by computer-executable instructions stored on non-transitory computer-readable media. For example, computer device 116 may include computer-executable instructions for receiving market data from exchange computer system 100 and displaying that information to a user. As another example, clearinghouse module 140 and/or other modules of exchange computer system 100 may include computer-executable instructions for performing operations associated with determining performance bond contributions associated with holdings in products that are based on various types of currency pairs.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

In at least some embodiments, exchange computer system 100 (or "system 100") receives, stores, generates and/or otherwise processes data so as to facilitate a decentralized process of disseminating information from the trading floor of a financial exchange. For example, some embodiments may facilitate the dissemination of pricing quotations by a trader from the floor of an open outcry financial market, such as via messages posted on a social network. In some cases, the messages may include other information, in addition to the pricing quotation, that may provide further insight into the price quotation and/or a market trend in the open outcry market. In some cases, the exchange computer system 100 or a portion of the exchange computer system 100 may be configured to perform a method to facilitate dissemination of pricing quotations from the floor of the open outcry market by receiving at the exchange computer system 100, a request from a trader to receive an authenticated user name associated with a financial exchange. The exchange computer system 100 may then permit the trader to use the authenticated user name provided by the financial exchange (e.g., generated by the exchange computer system 100) when posting one or more messages that include information about at least one trade on the financial exchange to a social network. The financial exchange may not validate the information provided by the participants in the open outcry financial market. Rather, the financial exchange may verify the identity of one or more authenticated users that provide the market information via the social network. This validation may better allow an information consumer to decide for themselves whether the pricing information provides a complete and/or accurate description of a particular financial instrument (e.g., pricing information, quantity available, etc.).

Because the exchange computer system 100 may allow accredited market participants to provide market information, the information consumer may determine whether or not to trust that the accredited market participants are providing accurate and/or reliable information. For example, the information consumer may use one or more methods to aggregate and/or analyze the financial market information provided by different traders on the trading floor of the financial exchange. For example, the information consumer may aggregate pricing quotations, and or other information, from different participants in the open outcry financial market. Once aggregated, the consumer may then filter, or otherwise limit, their information consumption to the output of trusted sources. In some cases, the exchange computer system 100 may be configured to perform at least a portion of the aggregating, analyzing and/or filtering functionality.

Figure 2:
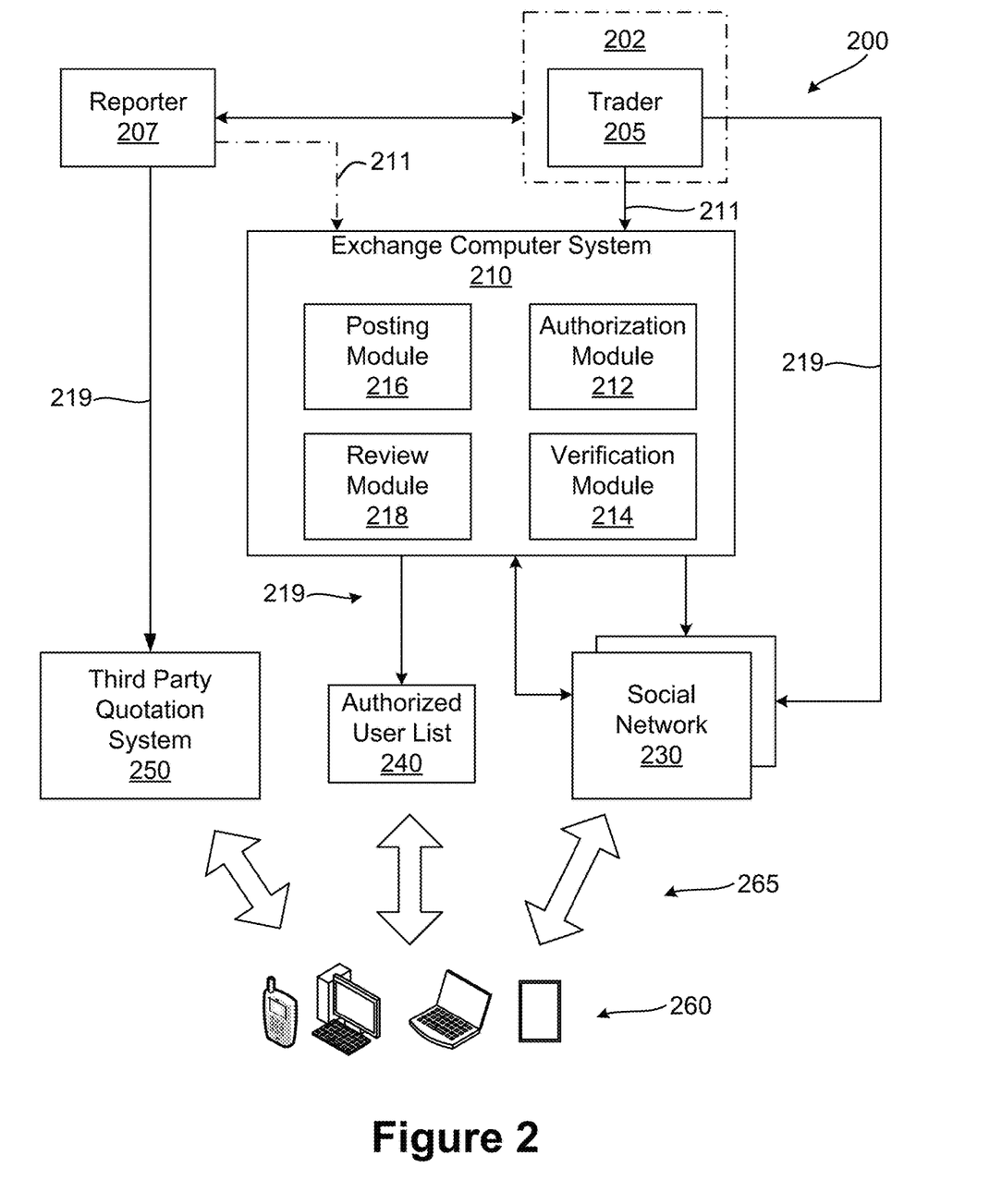
FIG. 2 shows a block diagram representation of a system for disseminating floor quotations from an open outcry market according to at least some embodiments.

FIG. 2 shows a block diagram representation of a system 200 for disseminating floor quotations from an open outcry market according to at least some embodiments. The system 200 may include financial exchange computing device 210 (e.g., the exchange computing system 100) that may be used for facilitating an information exchange between a trader 202 at the financial exchange 202 (e.g., a trader on an open outcry trading floor) and an information consumer 260 of social media that may access 265 social media via one or more of a computer (e.g., a laptop, a desktop, a tablet, etc.), a personal digital assistant (PDA), a smart phone, etc.). In some cases, the financial exchange 202 may include a corresponding electronic trading system (not shown) that may be used to facilitate electronic trading via one or more computers communicatively coupled to a network 211 associated with the financial exchange. The financial exchange 202 having the open outcry trading floor may be encountered as a marketplace for financial products (e.g., a stock, a bond, a derivatives product, an options contract, a futures contract, etc.), such as a stock exchange and/or a futures exchange. In such an open outcry environment, information about buy and/or sell orders, among other information, may be exchanged via verbal and/or gesture based communication (e.g., shouting, hand signals, etc.). As such, any bids and/or offers are made in the open market, either by verbal communication and/or by hand signals. This open outcry communication allows all market participants the ability to compete for an order and/or to bid at the best price. Such communication takes place on the floor (e.g., the "pit", the "trading room", the "dealing room", etc.) of the financial exchange 202. There, contract may be made via verbal and/or visual communication between parties (e.g., the trader 205) to a trading transaction. For example, a contract between parties may be executed when a first trader 205 "cries out" a specified selling price, and another trader 205 "cries out" an acceptance of that price. Often, the pits are surrounded by rows of workstations where orders from investors (e.g., institutional investors, individual investors, etc.) are received by phone and/or computer. These orders are carried to a trader 205 in the pit by runners and/or are "flashed" by hand signals.

Because, the communication on the trading floor relies on verbal and/or visual communication, one or more market reporters (e.g., the reporter 207) may be located in and/or near the pit. In some cases, the market reporter 207 may listen and/or watch communication between traders so that any discernible price change occurs during a course of trading, the new price information can be communicated outside the pit. Further, the trader 205 may be responsible for reporting information about a trade to the market reporter 207, but may not necessarily report a current price quotation (e.g., a current bid, a current offer, etc.) outside of a completed trade. In some markets, such as a futures market, a particular instrument may be traded frequently, so that a previously quoted price may be substantially similar to a current price quotation for that instrument. In other markets (e.g., an options market), however, merely reporting the trade price may not provide an investor with sufficient information due to the number of possible related products. For example, a particular instrument may not have been recently traded. Therefore, the last reported trade price may not accurately reflect the current market (e.g., a current bid price, a current offer price, etc.), particularly given a corresponding range of related instruments that may differ by expiration month, strike price, whether the product is classified as a put or a call, and the like. By allowing traders 205 and/or market reporters 207 to disseminate information from the trading floor via the social network 230, an investor (e.g., the information consumer 260) may have more information at hand when making an investing decision.

The market reporter 207 may communicate to one or more associates located adjacent to the pit. The market reporter 207 and/or the associates may key the price quotation information into a computer system for dissemination, such as by a quote board adjacent to the pit. In some cases, the pricing information may be communicated via a network (e.g., a WAN, a LAN, the Internet, a cellular network, etc.) for dissemination by a third party quotation system 250. In some cases, one or more video monitors may be available to traders in the pit for obtaining pricing information. For example, an option may not be active on a particular day, but a trader may be interested in the current market bid and offer for that specified option. In some cases, the video screens may be updated by the market reporters 207. In some cases, the video monitors may be adapted to display one or more messages posted to a social network, where the messages may be provided by the trader 205 and/or the market reporter 207 via an exchange computer system 210.

In some cases, the system 200 may be adapted to allow the trader 205, the market reporter 207 and/or an associate of the trader 205 or the market reporter 207, to be authorized by the financial exchange to post messages to a social network 230 from the trading floor and/or from an area adjacent to the trading floor of the financial exchange 202. In some cases, the social network 230 may include one or more different public and/or private social networks and/or message boards operated by a third party, (e.g., Twitter, Facebook, LinkedIn, etc.). In some cases, the social networks 230 may include a social network and/or message board operated by the financial exchange 202. The social networks 230 may further include a dedicated social network that may be dedicated and/or designed to communicate trading information disseminated from the trading of a financial exchange 202. In some cases, a social network may include an instant messaging system that may allow a trader to send an instant message to an individual or a group of individuals. An illustrative instant messaging system, which is not meant to be limiting in any way, is disclosed in, for example: U.S. patent application Ser. No. 13/466,572 filed on May 8, 2012, entitled "SYSTEM AND METHOD FOR PROCESSING SECURITIES TRADING INSTRUCTIONS AND COMMUNICATING ORDER STATUS VIA A MESSAGING INTERFACE", the entirety of which is incorporated herein by reference for all purposes.

The exchange computer system 210 (e.g., the exchange computer system 110 of FIG. 1) may include an authorization module 212, a verification module 214, a posting module 216 and/or a review module 218. The exchange computer system 210 may be communicatively coupled via a wired or wireless communication link (e.g., the network 219) to at least one social network 230. In some cases, the exchange computer system 210 may be configured to provide an authorized user list 240 via the communication link 219, such as by displaying a list of persons and/or organizations (e.g., the trader 205, the market reporter 207, a brokerage house, etc.) permitted to post information from and/or near the trading floor of the open outcry financial exchange 202. For example, the exchange computer system 210 may provide a web page accessible via the Internet and listing identification information about one or more authorized posters to particular social networks 230, such as a list of authorized user names. An illustrative authorized user list 240 may include identification information (e.g., an authorized user name, biographical information, etc.) about one or more of the trader 205 and/or the market reporter 207.

In some cases, the exchange computer system 210 (e.g., a server, etc.) may be configured to disseminate social media traffic (e.g., messages, posts, "tweets", and the like) to one or more social networks 230 from the floor of the financial exchange 202. These messages may include price quotations and/or additional information, such as metadata (e.g., "hash tags", tags, notes, etc.), that may allow consumers of the messages (e.g., institutional investors, individual investors, etc.) to more easily identify each quotation by reference to an identified feature of the message. In some cases, the information consumers 260 may identify a social media message or post by reference to a financial product, a particular trader 205, an organization associated with the trader 205, a particular market reporter 207, a market strategy, and/or the like. For example, in futures contracts, identification characteristics may include, but not be limited to, one or more of an identification of the market; a contract month; a price; a quantity of contracts, and other commentary characteristics of market activity and/or performance. In such cases, the trader 205 on the floor of the exchange may be allowed to send quotes and/or other related narrative messages directly from the floor of the financial exchange 202.

In some cases, the financial exchange 202 may desire to validate one or more of the messages before the messages are posted to the social network, such as by the posting module 216. For example, when a floor trader 205 sends and/or posts a message to the social network 230, the message may be received by the exchange computer system 210 via the network 211 for validation. In such cases, the exchange computer system 210 may conduct quality checks on the information contained in the message. For example, the exchange computer system 210 may be configured for comparing the price quote information with the message with a current price quote for the same financial product as output by an electronically traded version of the financial exchange 202. In some cases, a trusted user, such as an authorized trader 205 having a higher level authorization, may be allowed to post directly to the social network 230 via the communication link 219 (e.g., a LAN, a WAN, a cellular network, the Internet, etc.) and bypassing the exchange computer system 210. In these cases, and others, the exchange computer system 210 may be configured to use the review module 218 to review one or more posts to the one or more social networks 230 made by users of the social network, including authorized and/or unauthorized persons. In some cases, the review module 218 may be configured to monitor messages and/or other posts to the one or more social networks 230 to monitor references to the financial exchange 202. For example, the review module 218 may be configured to monitor one or more messages posted to one or more different social network 230 to identify misleading and/or improper information (e.g., a misidentified product, an old price, etc.). When the review module 218 identifies misleading and/or improper information posted by an authorized user, the review module 218 may be configured to revoke and/or suspend the authorization (e.g., suspend a user ID, revoke a user ID, etc.) of the trader 205 responsible for posting the misleading and/or improper information. In some cases, the review module 218 may be configured to provide one or more reports about messages posted from the trading floor to the social network. For example, the reporting module 218 may determine information about a frequency and/or a quality of the posts made by a particular trader 205.

Because any person registered with a particular social network 230 may post information on the social network 230, an information consumer 260 may need to determine which of the messages to trust. To help the information consumer 260 in this assessment, the financial exchange 202 may desire to provide information about traders 205 and/or market reporters 207 authorized to provide financial information directly from the trading floor of the financial exchange 202 via the social networks 230. In some cases, the financial exchange 202 may perform one or more validation procedures (e.g., validating a user identification, providing an authorized user name, correcting large pricing errors, etc.) to allow the information consumer to better determine which trader 205 and/or market reporter 207 provides financial information most helpful to them via the social network 230. In these cases, the information consumers 260 may monitor one or more of the floor's different traders 205 (e.g., members of the exchange) and/or market reporters 207 authorized by the financial exchange 202. In doing so, the information consumers 260 may, over time, determine which of the different authorized users provides the information most helpful to them.

In some cases, the financial exchange 202 may desire to monitor information about financial activities at the financial exchange 202 that may be posted on one or more social networks 230 by the traders 205 and/or the market reporters 207. To do so, the financial exchange 202 may use the authenticated user identification of the one or more floor traders 205 (e.g., members of the exchange) and/or market reporters to monitor information that is posted on the social network 230. For example, the exchange computer system 210 may perform a check (e.g., a random check, in response to a complaint from an information consumer 260, at a predetermined interval, etc.) of information provided in one or more messages posted to the social network 230. In such case, the exchange computer system 210 (e.g., the review module 218) may compare pricing information provided by one or more traders 205 via the social network 230 to similar pricing information (e.g., having a similar time stamp) available from the financial exchange 202, such as via an electronic trading system. If an error was found, the financial exchange may encourage the responsible trader 205 to post a correction of the information. As such, the information consumers 260 may gain a level of trust in the financial information content posted by the authorized traders 205 and/or market reporters. The information consumer 260 will then be able to determine which of the authorized traders 205 and/or market reporters 207 provide the information most helpful to them. In some cases, the financial exchange 202 may revoke the authorization of and/or suspend users that post improper and/or misleading information, such as in response to a complaint from an information consumer 260 and/or a determination made by the exchange computer system 210.

In some cases, the financial exchange 202 may desire to validate officially recognized posters on the social network 230. For example, the floor trader 205, the market reporter 207 and/or another authorized person (e.g., an associate of the floor trader), may be assigned a unique identification (ID), such as by the authorization module 212. In some cases, these IDs may be associated with each message posted on the social network 230 by the particular authorized user. For example, the ID may include a particular user name (e.g., @User_ID), that may be associated with a particular floor trader 230 or market reporter 207. In some illustrative examples, the authorized user name may include identifying information about the financial exchange 202. For example, the financial exchange 202 may append, or otherwise include, an identifier to a user ID (e.g., @ExchangeID_UserID) for indicating that a particular user was authorized by the financial exchange 202. In some cases, the ID may be used to identify one or more membership levels within the financial exchange, such as a membership to trade in all financial products offered in the financial exchange 202 or a membership that allows a trader 205 to trade in particular financial products (e.g., a currency product, an options product, a futures product, etc.). In some cases, the ID may be included within the message and/or as metadata associated with the message posted on the social network 230, such as a tag and/or a hash tag (e.g., #User_ID). By including the unique user identification, consumers of the messages on the various social networks 230 may be better able to identify messages from posters authorized by the financial exchange 202. In some cases, each message may include an automated time and/or date stamp (e.g., 2013_08_21_12:30:21GMT) to allow the information consumers 260 of the messages to identify an age of a particular message and/or a chronology of a series of messages. In some cases, the financial exchange computer system 210 (e.g., the review module 218) may monitor messages posted on one or more social networks 230 to determine whether users, other than the authorized traders 205 and/or market reporters 207, are using user names similar to those used by the officially recognized traders 205 and/or market reporters 207. In such cases, the financial exchange 202 may provide this information to the information consumer 260, such as by using an email message, a phone message, a text message, an instant message, a website posting, or the like. In some cases, the financial exchange 202 may provide this information to a provider of the social network 230 to avoid potential misleading and/or improper use of user names the same as and/or similar to those provided to the different authorized traders 205 and/or market reporters 207.

In some cases, the exchange computer system 210 may monitor the messages posted by one or more authorized users to determine a trend or other aggregated market information, such as by the review module 218. In some cases, the financial exchange 202 may aggregate messages received from different traders 205 on the trading floor and post the messages to the social network 230 under a single user name associated with the financial exchange 202 (e.g., @ExchangeID). In such cases, the financial exchange 202 may append, or otherwise include, information about the originator of the message by using metadata associated with the message. For example, the metadata may include a hash tag associated with an authorized post, such as for all verified and/or authorized messages, where the identification of the message originator (e.g., # User_ID) is indicated within the body of the message.

In some cases, the exchange computer system 210 may include at least one processor and at least one non-transitory memory (e.g., a RAM module, a ROM module, a Flash memory, an EEPROM, etc.). The processor may be configured to process instructions that cause the processor to perform operations for enabling one or more of the authorization module 212, the verification module 214, the posting module 216, and the review module 218. In some cases, the instructions may cause the processor to provide a user ID to the trader 205 after a successful authentication of one or more credentials associated with the trader, such as by the authorization module 212. For example, the authorization module may include a memory device that includes identification information about one or more traders 205, market reporters 207 and/or their associates. For example, the identification information may include a name, a brokerage, a business organization, private identification information (e.g., a social security number, an exchange generated identification number, a brokerage registration number, etc.). In some cases, the authorization module may prompt a user to enter identification information about an electronic device (e.g., a smart phone, a computer, a tablet computer, etc.) that may be used when disseminating information (e.g., posting messages) onto the social network 230 from an open outcry environment of a financial exchange 202.

In some cases, the exchange computing system 210 may include a verification module to verify messages submitted for posting by the one or more authorized users 205, 207 before posting to the social network 230. For example, the trader 205 may submit a message to be posted on a particular social network 230 (e.g., Twitter) that may include information about one or more financial transactions. The verification module 214 may perform one or more verification routines before posting the message to the social network 230. For example, the verification module 214 may verify the user ID provided with the message corresponds to the correct authorized trader 205. In some cases, the message may include a hardware identification number (e.g., a media access control (MAC) address, an internet protocol (IP) address, etc.) that may be checked against one or more hardware addresses associated with one or more registered hardware devices. In some cases, the verification module 214 may be configured to verify information provided in the message, such as by comparing a quotation provided in the pending message against a current quotation corresponding to an electronically traded environment associated with the financial exchange 202. In some cases, such as when the validation of the information about the one or more financial transactions is unsuccessful, the verification module 214 may be configured to block, or otherwise keep the failed messages from being posted on the social network 230. Upon a successful verification, the exchange computer system 210 may post the message to one or more desired social networks 230, such as by the posting module 216.

The posting module 216 may be configured to post a message submitted by the authorized user (e.g., the trader 205, the market reporter 207, etc.) to one or more different social networks 230. Examples of social networks 230 may include Twitter, Facebook, LinkedIn, message boards, discussion forums, a listserv, and the like. For example, the posting module 216 may be configured to format a message into a format specified by a particular desired social network 230. The information consumers 260 may access 265 the information posted to the one or more social networks 230 via one or more computing devices, such as a desktop computer, a server, a laptop, a tablet computer, a smart phone, a personal digital assistant, or the like.

In some cases, the posting module 216 may be configured to limit a number of characters included in the message to a specified finite limit (e.g., 132 characters). In other cases, the posting module 216 may be configured to format the message as a blog post, a format to be posted on a message board and/or an email to be disseminated via a listserv. In some cases, the authorized user may provide (e.g., append) metadata within the pending message. For example, the trader 205 may identify a bid price, an ask price, an identification of a market, a contract month, a strike price, a quantity, a market activity, and/or other market performance and/or a market strategy information. In some cases, the posting module 216 may be configured to analyze the content of the message and automatically generate the metadata. For example, the posting module 216 may include one or more "hash tags" (e.g., # bidprice, # askprice, # strikeprice, # strategy_name, etc.) that identify characteristics of the information being disseminated.

Figure 3:
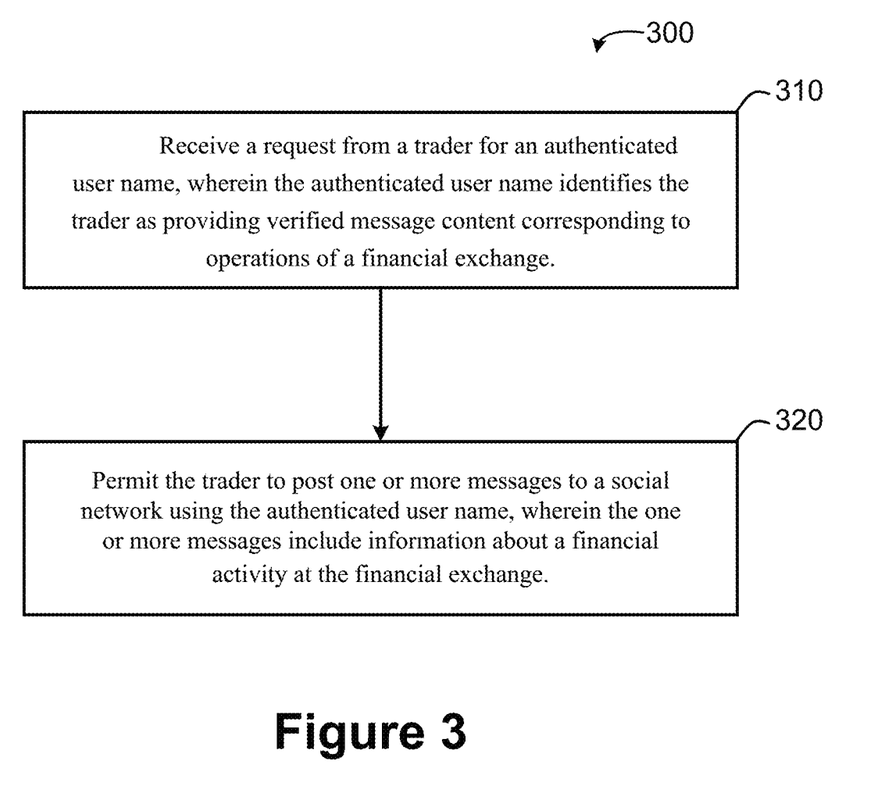
FIG. 3 is a flow chart showing steps performed in methods according to at least some embodiments.

FIG. 3 is a flow chart showing steps performed in methods according to at least some embodiments. In some cases, an illustrative method may include at 310 receiving, at a computer device (e.g., the exchange computing system 210), a request from the trader 205 for an authenticated user name, wherein the authenticated user name identifies the trader 205 as being authorized by the financial exchange to provide message content corresponding to operations of a financial exchange 202. At 320, the exchange computing device may permit the trader 205 to post one or more messages to a social network 230 (e.g., Twitter®) using the authenticated user name. The message may include information about a financial activity (e.g., a trade) at the financial exchange, such as a price, a strategy, or the like. In some cases, the method may further include receiving a message to be posted from the trader 205, wherein the exchange computing system 210 verifies information included in the message before posting the message on the social network 230. For example, the exchange computing system 210 may include the verification module for verifying the message content before posting the message to the desired social network 230, such as by using the posting module 216. In some cases, the method 300 may further include providing metadata associated with the message. For example, the metadata may include information providing insight into a market strategy. Such metadata may include at least one of an identification of a market, a contract month, a price, a quantity, market activity, and market performance.

For example, the exchange computing system may be configured to compare information disseminated in the message to current quotations corresponding to an electronically traded version of the financial exchange's products. In some cases, the method may include generating, or otherwise providing, an authorized user ID after a user has been authenticated by the exchange computing system 210. For example, the exchange computing system 210 may generate a user ID that may include unique user identification, unique financial exchange information, or both. The user identification and/or the financial exchange information may be used to indicate that a particular user has been authorized to post messages by the financial exchange, for example, from the trading floor of the financial exchange 202. By associating the authorized user name to the financial exchange, such as by including financial exchange information in the authorized user name, an information consumer 260 on one or more social media networks 230 may gain a level of trust that the financial exchange has verified, or otherwise has authorized, the content of posts by that particular trader 205.

If a message was not successfully validated, the method 300 may include blocking the message from being posted to the social network 230, such as by the posting module 216. In some cases, the method 300 may include monitoring messages associated with the financial exchange 202 that are posted on the social network 202 for improper and/or misleading information, such as misleading information about a financial product traded on the financial exchange 202. If such improper and/or misleading information is found, a user and/or device associated with the improper messages may be blocked and/or suspended from posting messages from the floor of the financial exchange 202.

CONCLUSION

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. For example, one of ordinary skill in the art will appreciate that some steps illustrated in the figures may be performed in other than the recited order, and that one or more steps illustrated may be optional in one or more embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

The invention claimed is:

1. A method of improving security on a social network by preemptively blocking malicious messages from being sent over the social network, the method comprising:
    receiving, via a local network at the exchange computing system, one or more messages from a mobile device of a trader, wherein the one or more message include at least a first device identifier comprising a media access control (MAC) address of the mobile device, wherein the one or more messages are to be posted on the social network after verification of information provided in the message;
    verifying, by a validation module, a source of the message by comparing the first device identifier with a list of authorized MAC addresses;
    validating, by the validation module of the exchange computing system, the information provided in the one or more messages by comparing a quotation provided in the message against a current quotation corresponding to an electronically traded version of the financial exchange;
    if the information was validated and a source of the message was verified, posting, by a posting module of the exchange computing system, the one or more messages to the social network via the Internet, wherein the posting includes inserting a tag certification into the one or more messages to identify the one or more messages as having been authorized by the financial exchange; and
    if the information was not validated, blocking, by the posting module of the exchange computing system, the one or more messages from being posted over the local network to the social network after an unsuccessful validation.

2. The method of claim 1, further comprising receiving, at the computing device, the message from the trader, wherein the computing device verifies the information in the message before the message is posted on the social network.

3. The method of claim 1, further comprising providing, by the computer device, an authenticated user name to the trader after verifying information provided by the trader, wherein the authenticated user name includes identification information about the trader and identification information about the financial exchange.

4. The method of claim 3, wherein the identification information of the financial exchange includes an indication that financial exchange has authorized the trader to post messages.

5. The method of claim 3, wherein the identification information of the trader comprises information that is used to identify one or more membership levels within the financial exchange.

6. The method of claim 3, wherein the identification information of the trader comprises information that is used to identify one or more membership levels within the financial exchange.

7. The method of claim 1, wherein the one or more messages includes metadata associated with the information provided in the message, wherein the metadata includes at least one of an identification of a market, a contract month, a price, a quantity, market activity, and market performance.

8. The method of claim 1, further comprising:
    analyzing content of the one or more messages;
    generating a hash tag; and
    appending the hash tag to the one or more messages.

9. The method of claim 1, further comprising monitoring, by the computer device, messages associated with the financial exchange that are posted on the social network for improper and/or misleading information about a financial product traded on the financial exchange.

10. One or more non-transitory computer-readable media storing computer executable instructions that, when executed, cause an exchange computer system to perform operations that include:
    authenticating, by an authentication module, a computing device of a trader who is an active participant in a financial exchange by verifying that a media access control (MAC) address of the computing device is present in a list of authorized MAC addresses stored in computer memory;
    providing, by the authentication module via a local network, an exchange authenticated user identification to the trader after a successful authentication, the authenticated user identification for use when posting information onto a social network;
    receiving, via the local network, one or more messages from the computing device of the trader, the one or more messages including information about a financial transaction on the financial exchange, wherein the one or more messages are to be posted on the social network after verification of the information provided in the message;
    validating, by a validation module of the exchange computing system, the information provided in the one or more messages by comparing a quotation provided in the message against a current quotation corresponding to an electronically traded version of the financial exchange;

if the information was validated, posting, by a posting module of the exchange computing system, the one or more messages to the social network, wherein the posting includes inserting a tag certification into the one or more messages to identify the one or more messages as having been authorized by the financial exchange; and if the information was not validated, blocking by the posting module of the exchange computing system the one or more messages from being posted to the social network after an unsuccessful validation.

11. The one or more non-transitory computer-readable media of claim 10, wherein the stored instructions further comprise instructions that, when executed, cause the exchange computer system to perform operations that include:

monitoring the one or more messages posted to the social network for misleading and/or improper information, and revoking authorization of the user identification of the trader when the trader associated with the user identification was found to have posted misleading and/or improper information onto the social network.

12. The one or more non-transitory computer-readable media of claim 10, wherein the stored instructions further comprise instructions that, when executed, cause the exchange computer system to perform operations that include appending metadata to the one or more messages, wherein the metadata includes at least one of an identification of a market, a contract month, a price, a quantity, market activity, and market performance.

13. The one or more non-transitory computer-readable media of claim 10, further comprising providing an authenticated username to the trader after verifying information provided by the trader, wherein the authenticated username includes identification information about the trader and identification information about the financial exchange.

14. The one or more non-transitory computer-readable media of claim 13, wherein the identification information of the financial exchange includes an indication that financial exchange has authorized the trader to post messages.

15. The one or more non-transitory computer-readable media of claim 13, wherein the identification information of the trader comprises information that is used to identify one or more membership levels within the financial exchange.

16. The one or more non-transitory computer-readable media of claim 13, wherein the identification information of the trader comprises information that is used to identify one or more membership levels within the financial exchange.

17. An exchange computing system comprising:
at least one processor; and
at least one non-transitory memory, wherein the at least one non-transitory memory stores instructions that, when executed, cause the processor to perform operations that include:

receiving, at an authorization module of the exchange computing system via a local network, a request from a computing device associated with a trader, for an authenticated user name, wherein the request comprises a media access control (MAC) address of the computing device, and wherein the authenticated user name identifies the trader as being authorized by the financial exchange to provide a message over a social network;

providing, by the authentication module of the exchange computing system via the local network, a user identification to the trader after a successful authentication of one or more credentials associated with the trader, wherein the successful authentication occurs when the MAC address of the computing device is present in a list of authorized MAC addresses stored in the at least one non-transitory memory, the user identification for use when posting information onto the social network over the local network;

receiving, via the local network at the exchange computing system, the message from the computing device associated with the trader, the message including information about a financial transaction on the financial exchange, wherein the message is to be posted on the social network after verification of information provided in the message;

validating, by a validation module of the exchange computing system, the information provided in the one or more messages by comparing a quotation provided in the message against a current quotation corresponding to an electronically traded version of the financial exchange; and if the information was validated, posting, by a posting module of the exchange computing system, the message to the social network and including the user identification, wherein the message is modified to include a tag certification to identify the message as having been authorized by the financial exchange.

18. The computing system of claim 17, wherein the non-transitory memory stores instructions that, when executed, cause the processor to perform operations that include providing a list including user identification information of one or more traders authorized to post messages.

19. The computing system of claim 17, wherein the non-transitory memory stores instructions that, when executed, cause the processor to perform operations that include monitoring messages associated with the financial exchange that are posted on the social network for improper and/or misleading information about a financial product traded on the financial exchange.

20. The computing system of claim 17, wherein the message includes metadata associated with the one or more financial transaction, the metadata including at least one of an identification of a market, an identification of a financial product, a contract month, a price, a quantity, market activity information, and market performance information.

* * * * *